(12) United States Patent
Goodman et al.

(10) Patent No.: US 8,886,667 B2
(45) Date of Patent: Nov. 11, 2014

(54) METHOD AND SYSTEM FOR PROVIDING DISTRIBUTED STORAGE SYSTEM USING CONSUMER STORAGE MEDIA

(75) Inventors: Lee Goodman, Tyngsboro, MA (US); Punita Mishra, Potomac, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 270 days.

(21) Appl. No.: 12/814,623

(22) Filed: Jun. 14, 2010

(65) Prior Publication Data

US 2011/0307514 A1    Dec. 15, 2011

(51) Int. Cl.
*G06F 17/30* (2006.01)
*G06F 7/00* (2006.01)

(52) U.S. Cl.
USPC ......................................................... 707/770

(58) Field of Classification Search
USPC ......................................................... 707/770
See application file for complete search history.

(56) References Cited

U.S. PATENT DOCUMENTS

| | | | |
|---|---|---|---|
| 2002/0154892 A1* | 10/2002 | Hoshen et al. | 386/87 |
| 2007/0186266 A1* | 8/2007 | Watson et al. | 725/134 |
| 2009/0077613 A1* | 3/2009 | Edwards et al. | 725/139 |
| 2010/0211967 A1* | 8/2010 | Ramaswamy et al. | 725/14 |

* cited by examiner

*Primary Examiner* — Kuen Lu

(57) ABSTRACT

An approach is provided for providing a distributed database management and distributed storage system, which can use consumer storage media. A query for data stored in a distributed database formed by a plurality of storage media is received. The plurality of storage media corresponds to a plurality of set-top boxes. A determination is made that which one or more of the set-top boxes is associated with the data stored in the storage media. A request for the data is generated in response to the received query. The request is transmitted to the determined one or more of the set-top boxes.

22 Claims, 9 Drawing Sheets

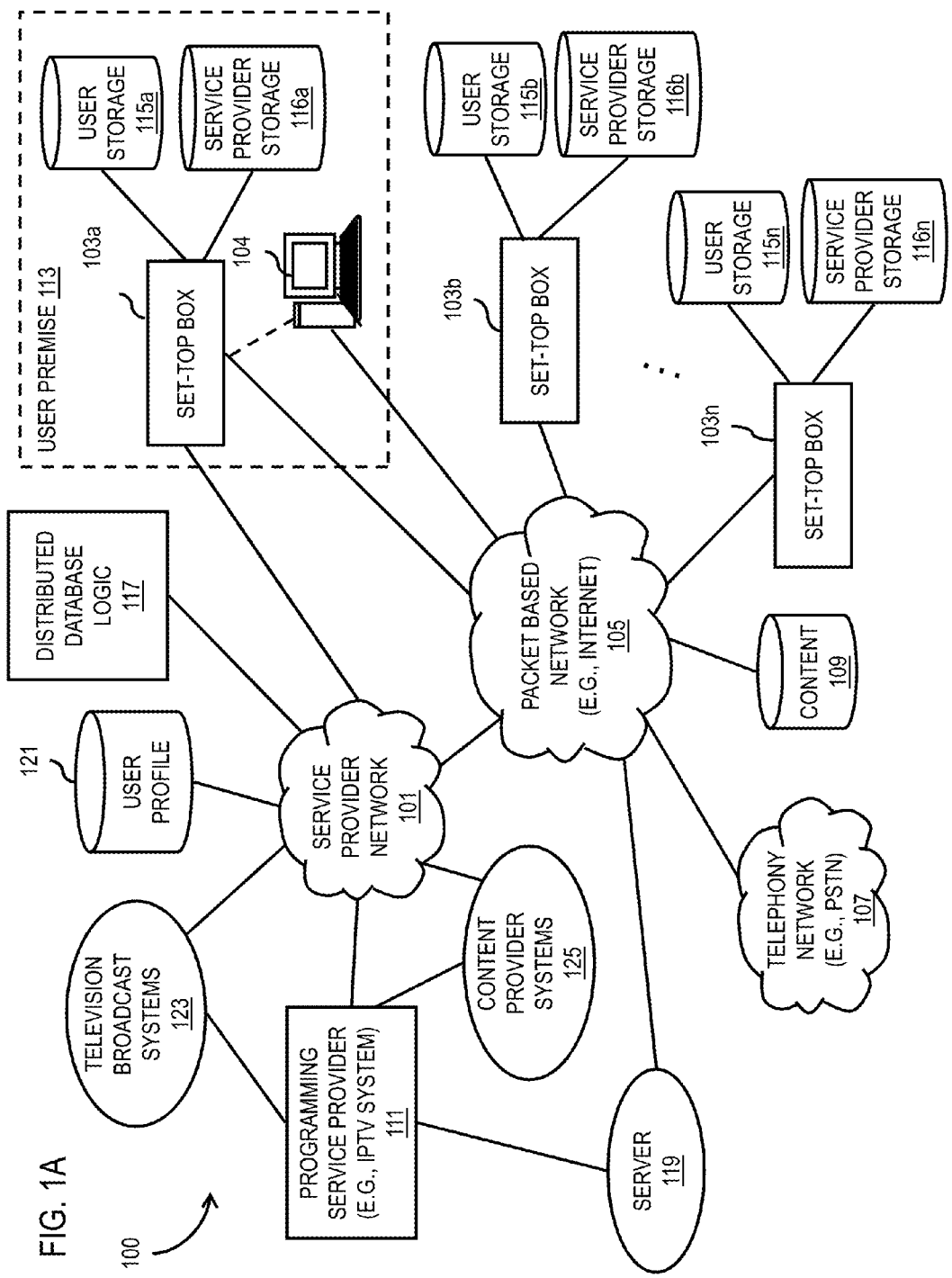

METHOD AND SYSTEM FOR PROVIDING DISTRIBUTED STORAGE SYSTEM USING CONSUMER STORAGE MEDIA

BACKGROUND INFORMATION

Service providers offer an array of applications and services relating to entertainment and business. As the advancement of broadband technologies continue, the rate and sophistication of these applications and services will undoubtedly increase. A key element in the successful implementation of these applications and services involves the proper and efficient management of the underlying data. Additionally, data security must be ensured. Data centers have emerged to address the growing data storage need in view of these concerns. However, such data center solutions are expensive. Also, scalability can be problematic due, in part, to physical constraints of the facilities, etc. Furthermore, for service providers, investment in infrastructure imposes a heavy cost; and thus, maximizing use of the resources of the current infrastructure is necessary to recoup the investment.

Therefore, there is a need for an approach to more efficiently and economically provide a storage system that leverages existing resources and is scalable.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 1A and 1B, are, respectively, a diagram of a system capable of providing distributed storage using consumer storage media, and a process for managing the distributed storage system, according to various exemplary embodiments;

DESCRIPTION OF THE PREFERRED EMBODIMENT

Figure 1B:
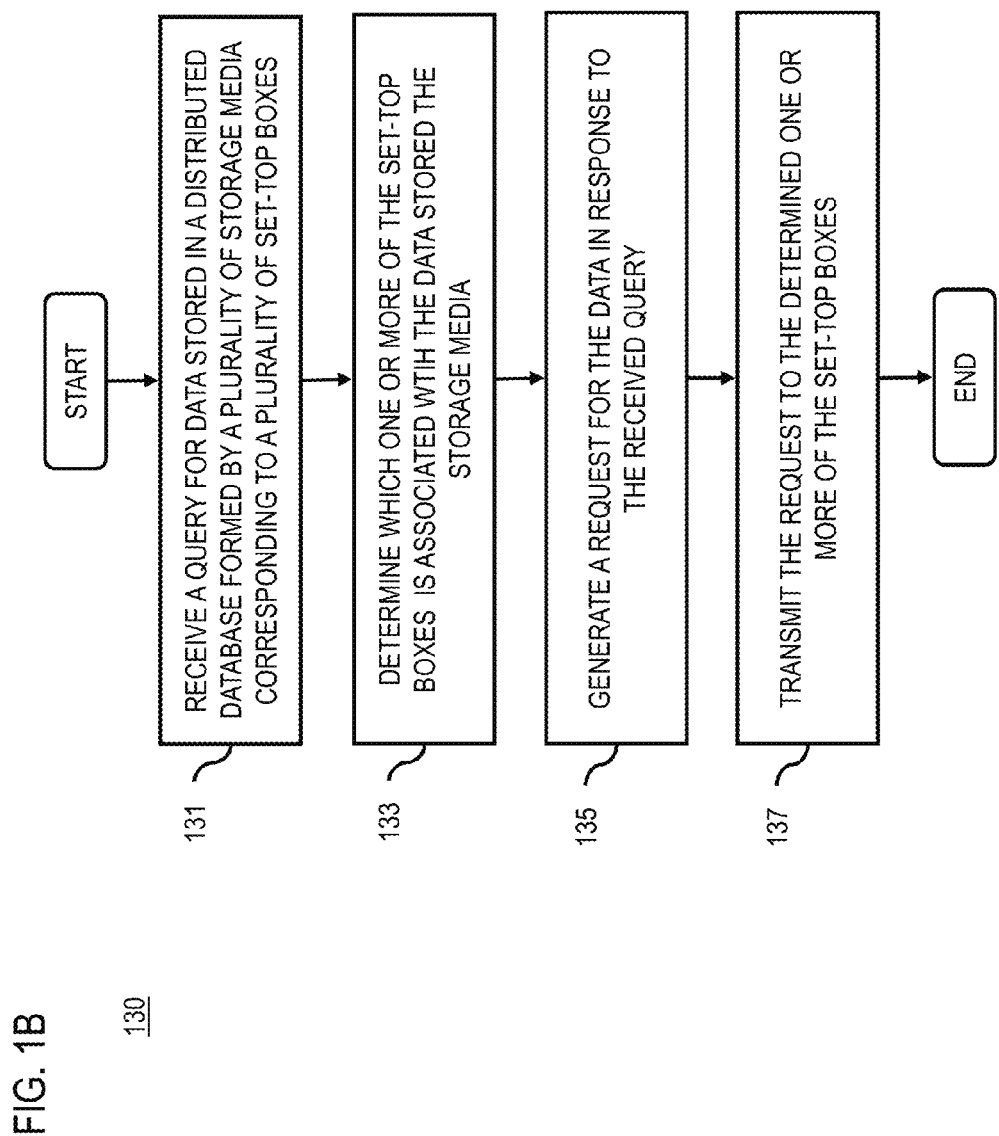

A preferred apparatus, method, and system for providing distributed storage using consumer storage media are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

FIG. 1A is a diagram of a system capable of providing distributed storage using consumer storage media, according to an exemplary embodiment. By way of example, a service provider employs the resources of system 100 to offer content delivery and other application services. In addition to content, data storage is needed for other business functions associated with the service offerings of the provider—e.g., accounting information, user profile information, etc. As will be evident, such a system 100 requires extensive investment in facilities, equipment, etc. Under this scenario, service provider network 101 integrates the television medium with that of the telecommunications, computing, and media environments, thereby broadening the scope of devices and sources available to individuals for obtaining programming content or other media. By way of example, service provider network 101 can provide programming content that may include any audio-visual content (e.g., broadcast television programs, digital video recorder (DVR) content, on-demand programs, pay-per-view programs, IPTV (Internet Protocol Television) feeds, DVD related content, etc.), pre-recorded media content, data communication services content (e.g., commercials, advertisements, videos, movies, songs, audio books, etc.), Internet-based content (e.g., streamed video, streamed audio), and/or any other equivalent media form.

STBs 103a-103n and/or user device 104 can communicate using the packet-based network 105 and/or the telephony network 107. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (Wi-Fi) networks, other wireless networks (e.g., 3G wireless broadband networks, mobile television networks, radio networks, etc.), terrestrial broadcasting networks, provider specific networks (e.g., a Verizon® FiOS® network, a TiVo network, etc.), and the like. Such networks may also utilize any suitable protocol supportive of data communications, e.g., transmission control protocol (TCP), internet protocol (IP), file transfer protocol (FTP), telnet, hypertext transfer protocol (HTTP), asynchronous transfer mode (ATM), socket connections, Ethernet, frame relay, and the like, to connect STBs 103a-103n to various sources of media content. Although depicted in FIG. 1A as separate networks, packet-based network 105 and/or telephony network 107 may be completely or partially contained within service provider network 101. For example, service provider network 101 may include facilities to provide for transport of packet-based and/or telephony communications.

As discussed previously, media or programming content broadly includes any audio-visual content (e.g., broadcast television programs, VOD programs, pay-per-view programs, IPTV feeds, DVD related content, etc.), pre-recorded media content, data communication services content (e.g., commercials, advertisements, videos, movies, songs, images, sounds, etc.), Internet services content (streamed audio, video, or pictographic media), and/or any other equivalent media form. In this manner, the programming service provider 111 may provide (in addition to the provider's own programming content) content obtained from other sources, such as one or more television broadcast systems 123, one or more third-party content provider systems 125, content residing in a repository 109 or accessible via server 119, as well as available via one or more packet-based networks 105 or telephony networks 107, etc.

Distributed storage mechanisms are prevalent, particularly for storage solutions for online applications over, for instance, the World Wide Web. Although advances in protocols and operations of the distributed storage systems have been made, the issues of cost and leveraging existing infrastructure have been lacking. To address this problem, the system 100 of FIG. 1A provides a distributed storage system that advantageously utilizes user storage devices (e.g., storage media), which can reside in the user and/or consumer premise. Specifically, a consumer's set-top box (which can be provided by, for example, a service provider) can include and/or be connected to one or more storage devices. In one example, the set-top box and/or the storage device can be purchased by, given to, and/or rented by the consumer. Part of the storage device (such as a partition of the storage device) and/or a separate storage device can be available to the consumer for personal use. Therefore, the rest of the storage device (e.g., other partitions of the storage medium) and/or a separate storage device located at the consumer premise can be allocated to the distributed storage system.

As shown in FIG. 1A, the system 100 can be configured to provide and manage a distributed storage system using the consumer storage device. According to certain embodiment, the STBs 103a-103n may be used alone or in combination with distributed database logic 117 to implement various exemplary embodiments relating to providing and managing a distributed storage system using consumer storage devices. The database logic 117 may be deployed within a standalone system or reside in an application server, for example. As will be more fully discussed, logic 117 can be deployed in whole or in part among the STBs 103a-103n; thus, logic 117 and the storage media 116a-116n form a distributed storage system). In one exemplary embodiment, the user storage 115a and the service provider storage device 116a can be separate from the set-top box 103a. Additionally or alternatively, the storages 115a and/or 116a can be entirely or partially part of the set-top box 103a. Also, although the storages 115a and 116a are illustrated as separate devices, it is contemplated that these storages can be part of one storage device that can be partitioned into different sectors. According to an exemplary embodiment, the user premise 113 can include set-top box 103a, user storage device 115a, service provider storage device 116a, and user device 104.

In certain embodiments, a user device 104 may be any type of computer device or mobile device. Computer devices may include desktop computers, notebook computers, servers, terminal workstations, gaming systems, customized hardware, or other equivalent apparatus. Mobile devices may include wireless telephones, cellular telephones, satellite telephones, personal digital assistants (PDA), pocket personal computers, smart phones, tablets, handsets, portable gaming systems, and customized hardware, as well as other mobile technologies capable transmitting data.

In the example of FIG. 1, STBs 103a-103n are located at one or more user premises (e.g., user premise 113), and geospatially associated with one or more regions. STBs 103a-103n may be configured to communicate with and receive signals and/or data streams from a programming service provider 111 (or other transmission facility). These signals include results of applying search or browse operations on the available programming content (e.g., video assets) and related date (e.g., programming guide data, metadata) retrieved over a data network (e.g., service provider network 101, packet-based network 105, and/or telephony network 107), as well as conventional video broadcast content.

According to certain embodiments, the user storage device 115a can be available to the user and can be used to store user data. However, in one example, the service provider storage device 116a can be unavailable to the user and can be available to, for example, the service provider to implement the distributed storage system. Therefore, the system 100 of FIG. 1A can advantageously use the already available storage space in the user premise 113 to provide distributed database. According to certain embodiments, the distributed database logic 117 can manage distributed database mechanisms, which can be used to access the distributed storage devices. In one example, the distributed database logic 117 can be implemented in a central mode. Alternatively, the distributed database logic 117 can be implemented in a distributed manner to advantageously decentralize responsibilities such as data access, retrieval, query, update, division, replication, etc. In one example, the STBs 103a-103n can include distributed database logic similar to, the same as, and/or different copy of the distributed database logic 117.

According to certain embodiments, the distributed database logic 117 along with the service provider storage device 116a can provide necessary distributed database management for the distributed storage system of system 100. In one exemplary embodiment, the distributed database logic 117 can initiate a replication process to store data in several locations, such as several user premises in order to ensure availability, reliability, fault-tolerance, and/or accessibility of the data. The replication process in system 100 can be performed with the consideration that the set-top box 103a and/or the service provider storage device 116a can become unavailable due to, for example, offline mode, power and/or hardware failure, disk crashes, etc. In an embodiment, the replication process can include sharing information and/or data between redundant resources to ensure consistency. It is contemplated that different replication schemes (e.g., transactional replication, state machine replication, virtual synchrony, etc.) can be used to ensure redundancy across the network.

Also, the distributed database logic 117 in communication with the set-top box 103a and/or service provider storage device 116a, according to certain embodiments, can keep track of multiple copies of the data that is stored in different storage devices, such as the storage devices located in the user premises. Further, the distributed database logic 117 can also maintain the consistency across multiple copies of stored data. As discussed earlier, the distributed database management can be performed in a central manner or in a decentralized and distributed way. According to certain embodiments same or similar copies of the distributed database logic 117 can be located in and/or in communication with the STBs 103a-103n to manage the distributed storage system. According to certain embodiments, the decentralization of responsibilities and hierarchical distribution can be used to advantageously reduce network traffic and increase efficiency of the system For example, the storage devices in the user premises (such as the service provider storage device 116a of the user premise 113) can include one or more sectors to store data. Further, continuing with this example, the distributed database logic 117 and/or the decentralized distributed database logic (not shown) of the STBs 103a-103n can include a sector map that provides the location of a master node for a particular sector. The sector map can specify the relationship of the nodes (e.g., hierarchical structure). According to certain embodiments, nodes can include the set-top box and/or the storage device located in the user premises. However, it is contemplated that other servers and/or storage devices can be used in the distributed storage system 100. In on embodiment, the master nodes can contain redundant data and the master nodes need to be updated in order for any change in data be committed. Further, master nodes can be responsible for replicating the data onto other nodes and maintaining status of these secondary nodes, according to certain embodiments. According to certain embodiments, the status of a secondary node can include "current" illustrating a responsive node with an up-to-date copy of data, "suspended" indicating that a non-responsive node, and "dirty" indicating, for example, a node with an out-of-date data. It is contemplated that other status definitions can be used to describe the secondary nodes.

According to an exemplary embodiment, a request to access, retrieve, and/or update data can be received at, for example, the set-top box 103a of the user premise 113. In one example, the request can include the sector for access, retrieve, and/or update. In one embodiment, the node (e.g., the set-top box 103a) can determine, for example, using the sector map, a master node associated with the requested sector. Further, the node can direct the request to one or more of the determined master nodes. According to one embodiment, the master node that receives the request, for example, the request to access data can retrieve the requested data and return it to the requestor. Alternatively or additionally, the master node can provide a checksum, determine a secondary node with "current" status, and redirect the request to the secondary node for retrieval. According to one example, when the request is redirected by a master node to a secondary node with "current" status, if the request is not fulfilled by the secondary node, the status of that node can be updated in the replication map as "suspended" to avoid future requests being directed to that location. According to certain embodiments, the master node and/or the secondary node that redirects the requests and/or provides the service (such as access, retrieval, update, replication, etc.) can perform authentication processes to verify security information of the requester before granting services. Alternatively or additionally, the authentication process can be performed during the generation of the request. Accordingly, the distributed management system can advantageously be independent of file system data authentication (such as encryption) process.

The distributed storage management functions, as implemented by logic 117, as described above ensures redundancy and reliability without increasing network traffic or sacrificing the efficiency. Further, the distributed storage system (encompassing logic 117 and the storage media 116a-116n) can be resilience to different parameters such as number of available nodes, redundancy, amount of storage per node, etc.

According to certain embodiments, the distributed database logic 117 (in the centralized and/or the decentralized manner) can provide necessary load balancing to distribute data and/or workload across the distributed storage system 100 by taking into consideration of the resources of the distributed storage system as a whole. For example, factors, which can affect where and how the data is stored, include network bandwidth, capacity of the storage media (associated with the set-top box), processing power of the set-top box, operational state (e.g., on, off, idle, etc.) of the set-top box, etc. According to an exemplary embodiment, when the distributed database logic 117 receives a request to perform a function on data (such as, but not limited to, access the data, retrieve the data, update the data, replication the data, etc.) that is stored in the distributed storage (and/or database) system 100, the distributed database logic 117 can determine one or more of the STBs 103a-103n that has the data stored in associated partitions of, for example, the service provider storages 116a-116n. Continuing with this example, the distributed database logic 117 can further determine the status of the determined set-top boxes to decide whether they are available to be accessed. Additionally, according to certain embodiments, the distributed database logic 117 can be configured to determine the traffic load for the available determined set-top boxes. In this case, the distributed database logic 117 can advantageously plan to generate and forward a request for the data to balance the load on the set-top boxes.

According to one example, the load balancing provided by the distributed database logic 117 can include determining the upload load traffic for the determined set-top boxes, e.g., the traffic from the set-top box to the network. Additionally or alternatively, it can include determining the load traffic from the network to the set-top box. In one example, the distributed database logic 117 can use further information from the service provider (for example from the service provider network 101) to determine the traffic load from the network to the set-top box.

According to an example, server 119 can be an "online" system capable of communicating with one or more third-party web servers (not illustrated), content repositories (e.g., repository 109), or equivalent facilities, to provide users various avenues to locate, specify, receive, and/or share programming content that is accessible over a data network (e.g., packet-based network 105). For instance, exemplary embodiments of applications may comprise hypertext markup language (HTML) user interfaces or JAVA™ applets stored on server 119 and accessed via world-wide-web pages. These interfaces are particularly useful in extending system 100 functionality to devices having limited resources (e.g., PDAs, handsets, thin-clients, etc.). In alternative embodiments, server 119 is collocated with and/or integrated into programming service provider 111. As such, multiple users, interfaces, and instances of applications can be simultaneously realized through system 100.

In one embodiment, a user profile repository 121 along with content repository 109, or server 119 may be accessed via one or more service provider networks 101 and/or packet-based networks 105. In one embodiment, the user profile repository 121 stores user settings, preferences, and configuration information for different services provided by the service provider. Further, service provider network 101 may include a system administrator (not shown) for operational and management functions to deploy the virtual channel service using, for instance, an internet protocol television (IPTV) system. In this manner, STBs 103a-103n can utilize any suitable technology to draw, receive, and/or transmit media content from/to a programming service provider 111 or other content source/sink. A more detailed explanation of an exemplary STB is provided with respect to FIG. 3.

In an exemplary embodiment, STBs 103a-103n can draw, receive, and/or transmit programming guide information and related content from (or to) multiple sources, thereby alleviating the burden on any single source, e.g., programming service provider 111, to gather, supply, or otherwise meet the content demands of any user or premise. Thus, particular embodiments enable authenticated third-party television broadcast systems 123, third-party content provider systems 125, and servers (e.g., server 119) to transmit programming content accessible over a data network to STBs 103a-103n either apart from, or in conjunction with, programming service provider 111. Such programming content may include content regarding traffic, news, sports, current events, breaking stories, commentary, headlines, advertisements, solicitations, financial advice, stocks, markets, events, schools, governments, blog entries, podcasts, and the like. Moreover, media content may be available from authenticated sources, including grassroots groups or individuals, non-profits, governmental organizations, public/private institutions, etc.

In various embodiments, service provider network 101 may include one or more video and/or audio processing modules (not shown) for acquiring and transmitting programming guide information and related content feeds (including content accessible over a data network) from programming service provider 111, the television broadcast systems 123, the third-party content provider systems 125, or servers 119 over one or more of the networks 101, 105, 107, to particular STBs 103a-103n. Accordingly, service provider network 101 may include facilities to support compression/decompression, coding/decoding, modulation/demodulation, optical/electrical conversion, and analog/digital conversion, as well as any other suitable signal processing and/or transmission operation. Further, service provider network 101 can optionally support end-to-end data encryption in conjunction with programming guide creation and related content streaming services such that only authorized users are able to access personalized programming guides and experience content reference therein.

Accordingly, system 100 may include an authentication module (not shown) configured to perform authorization/authentication services and determine whether users or content sources are indeed subscribers to, or providers of, the personalized programming guide service. An authentication schema may require a user name and password, a key access number, a unique machine identifier (e.g., media access control (MAC) address), etc., as well as a combination thereof. Once a subscriber has authenticated a presence on system 100, the user may bypass additional authentication procedures for executing later applications (e.g., programming content streaming instances). Data packets, such as cookies, may be utilized for this purpose. Thus, once an STB or content source is authenticated, connections between the STBs 103a-103n and the content sources may be established directly or through the programming service provider 111.

In other embodiments, authentication procedures on a first device (e.g., STB 103a) may identify and authenticate a second device (e.g., user device 104) communicatively coupled to, or associated with, the first device. Further, the authentication module may grant users the right to receive programming guide information and related content from multiple system 100 sources by revoking existing sets of digital certificates associated with a particular provider, and issuing new sets of digital certificates mapped to a second provider. In this regard, an STB (e.g., STB 103a) may receive new programming content or guide information from a second source, whereas the previous session may be automatically closed when the "old" or prior certificates associated with the first source are revoked. This enables users to initiate secure sessions at any given STB 103a-103n (or end terminal 104) linked to system 100, whether or not the STB (or end terminal) belongs to that individual user. It is additionally contemplated that multiple rights sessions may exist concurrently.

In particular embodiments, programming service provider 111 may comprise an IPTV system configured to support the transmission of television video programs from the broadcast systems 123 as well as other content, such as content from the various third-party sources (e.g., 109, 119, 123, 125) utilizing internet protocol (IP). That is, the IPTV system 111 may deliver programming guide information, signals and/or streams, including programming content accessible over a data network, in the form of IP packets. Further, the transmission network (e.g., service provider network 101) may optionally support end-to-end data encryption in conjunction with the streaming services, as previously mentioned.

In this manner, the use of IP permits television services to be integrated with broadband Internet services, and thus, share common connections to a user site. Also, IP packets can be more readily manipulated, and therefore, provide users with greater flexibility in terms of control and offers superior methods for increasing the availability of programming guide information and related content. Delivery of video content, by way of example, may be through a multicast from the IPTV system 111 to the STBs 103a-103n. Any individual STB may tune to a particular content source by simply joining a multicast (or unicast) of the media content, utilizing an IP group membership protocol (IGMP). For instance, the IGMP v2 protocol may be employed for joining STBs to new multicast (or unicast) groups. Such a manner of content delivery avoids the need for expensive tuners to view media content, such as television broadcasts; however, other delivery methods, such as directly modulated carriers (e.g., national television systems committee (NTSC), advanced television systems committee (ATSC), quadrature amplitude modulation (QAM)), may still be utilized. It is noted that conventional delivery methods may also be implemented and combined with the advanced methods of system 100. Further, the programming content may be provided to various IP-enabled devices, such as those computing, telephony, and mobile apparatuses previously delineated.

An STB (e.g., STB 103a) may integrate all the functions of an IPTV system, as well as combine the programming content and video asset management functions of the various online or off-line environments. For example, it is contemplated that the personalized programming guide service may be extended to users with a presence on the Internet. In alternative embodiments, the services of system 100 could be extended to users having an end terminal (not shown), such as a plain old telephone service (POTS) device, connected to the telephony network 107. While system 100 is illustrated in FIG. 1, the exemplary components are not intended to be limiting, and indeed, additional or alternative components and/or implementations may be utilized.

In certain embodiments, a user device may be any type of computer device or mobile device. Computer devices may include desktop computers, notebook computers, servers, terminal workstations, gaming systems, customized hardware, or other equivalent apparatus. Mobile devices may include wireless telephones, cellular telephones, satellite telephones, personal digital assistants (PDA), pocket personal computers, smart phones, tablets, handsets, portable gaming systems, and customized hardware, as well as other mobile technologies capable transmitting data.

Although the user equipment is described with respect to an STB 103, it is contemplated that various embodiments have applicability to any device capable of processing video, audio, and/or multimedia streams.

FIG. 1B is a flowchart of a process for managing the distributed storage system, according to an exemplary embodiment. For the purpose of explanation, this process can be executed by the distributed database logic 117 of FIG. 1A and is described with respect to the system of FIG. 1A. In step 131, a query for data is received. According to certain embodiments, the query can be received at the distributed database logic 117 of FIG. 1A. The received query can be for data stored in the distributed storage (and/or database) system of FIG. 1A, which is formed based, at least in part, on storage media (such as user storage 115a-115n and/or service provider storage 116a-116n) corresponding to the set-top boxes 103a-103n. As discussed earlier, the storage media can include partitions designated for the distributed storage/database system, such as the service provider storage media 116a-116n.

In step 133, the process 130 can determine which one or more of the STBs 103a-103n is associated with the requested data stored in the storage media. If the storage media is configured in partitions (one partition for the user, and one for the service provider), the data would reside in the service provider's partition. In steps 135 and 137, in response to the received query and the determination of the one or more set-top boxes, a request is generated and is transmitted to the determined one or more of the set-top boxes. According to certain embodiments, the generated request can initiate, for example, retrieval of data from the service provider storage media associated with the determined set-top boxes, the retrieved data can be received, and returned to the requester.

It is contemplated that any type of data can be stored by the service provider, such as content, control data, accounting data, user or subscriber information, etc.

Figure 2A:
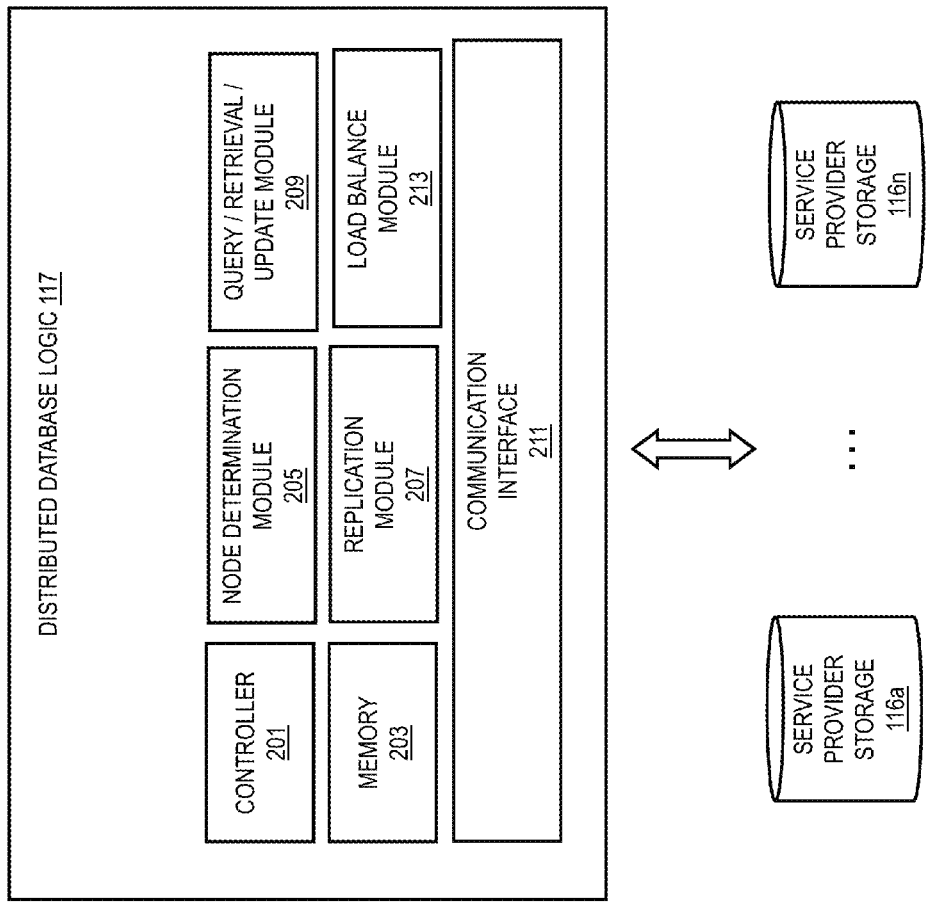
FIGS. 2A and 2B are, respectively, a diagram of a distributed database logic configured to manage a distributed storage, and a diagram of a sector map and a replication map, according to various exemplary embodiments.
Figure 2B:
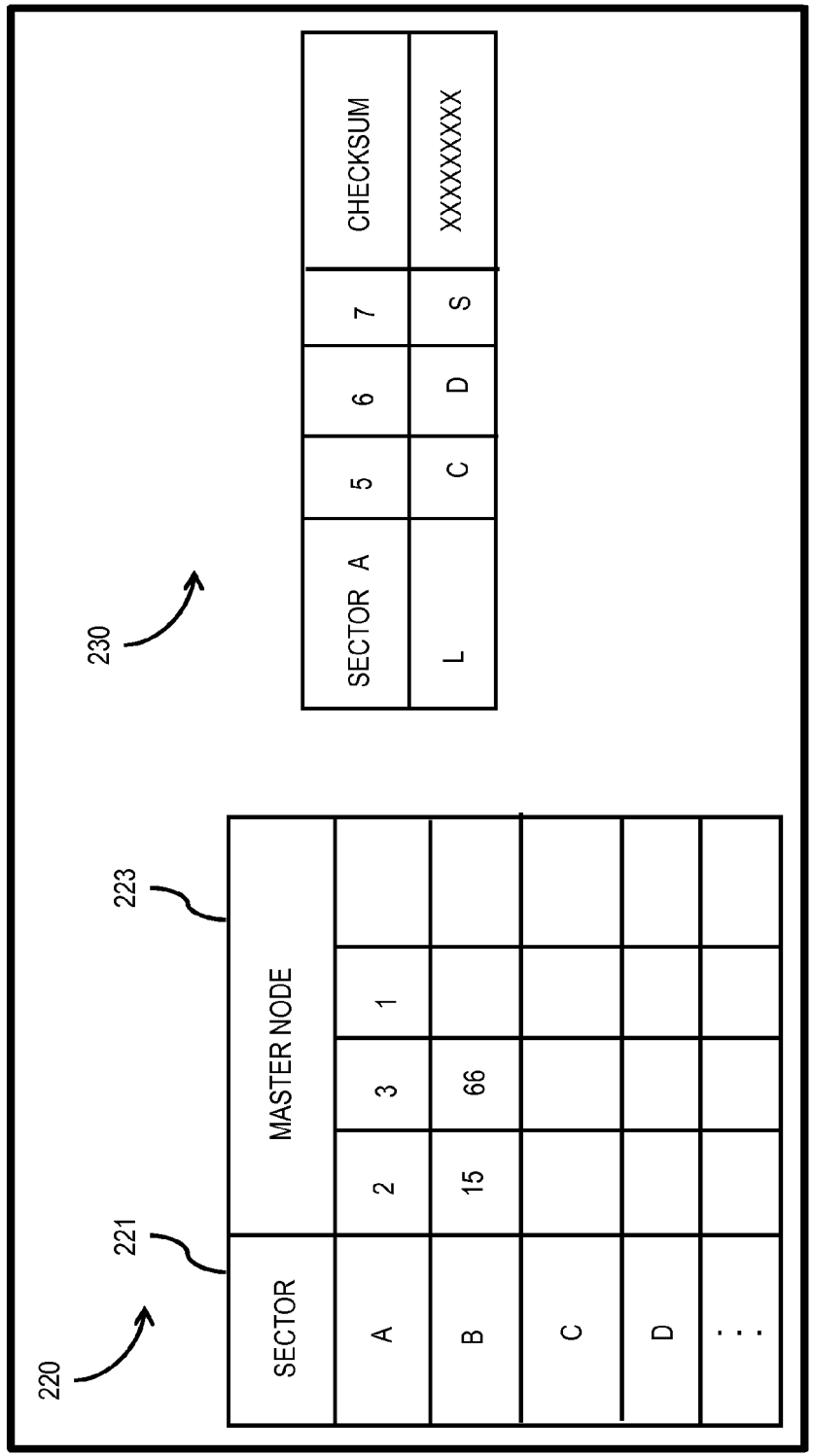

FIG. 2A is a diagram of a distributed database logic configured to manage a distributed storage, according to an exemplary embodiment. It is contemplated that the functions of these components may be combined in one or more components or performed by other components of equivalent functionality. As discussed earlier, the distributed database logic 117 can operate as a decentralized platform, a centralized platform, or a combination thereof. According to one exemplary embodiment, the decentralized distributed database logic 117 can function as part of the set-top box (for example, STB 103a). This exemplary embodiment is discussed in more details with respect to FIG. 3. Further, FIG. 2B is a diagram of a sector map and a replication map, according to an exemplary embodiment. These maps of FIG. 2B are explained in more detail with respect to the components of the distributed database logic 117 of FIG. 2A.

In one embodiment, the distributed database logic 117 can include at least a controller 201 or other control logic and a memory 203 for executing at least one algorithm for performing the functions of the distributed database logic 117. However, it is contemplated that the distributed database logic 117 can additionally or alternatively be in communication with other controllers and/or memories, such as the exemplary embodiment of FIG. 3. According to certain embodiments, the controller 201 and the memory 203 in communication with communication interface 211 are configured to receive request from different entities of system 100 of FIG. 1A to access data that can be stored in the service provider storage devices 116a-116n in the customer (i.e., user or consumer) premise. According to one example, the access request can include, but not limited to, request to retrieve data, request for replication, request for update data and/or information associated with the data, etc. The distributed database logic 117 is configured to determine location(s) associated with the requested data and is configured to provide the data and/or perform the requested functions for the data.

According to certain embodiments, the storage devices located in the user premises that are in communication with the STBs and are used for the distributed storage system can include one or more sectors and/or partitions used to store data. As discussed earlier, a sector map, such as the sector map 220 of FIG. 2B, can be used to maintain the location of master nodes for a particular sector. According to certain embodiments, the master nodes can contain redundant data and the master nodes need to be updated in order for a change to be committed. Also, in another example, the master nodes are responsible for replication the current data onto other nodes and maintain the status of these secondary nodes (using, for example, replication module 207). In one exemplary embodiment, the sector map can be maintained in a centralized manner at the distributed database logic 117. Additionally or alternatively, the distributed database logic 117 can operate in a distributed manner at different locations (such as at the STBs in user premises) and therefore, the sector maps can be maintained at each location. Accordingly, the distributed database logic 117 can include a node determination module 205 configured to determine master node(s) (location(s), STB(s), etc.) and/or secondary node(s) (location(s), STB(s), etc.) that stores the requested data.

In one exemplary embodiment, the distributed database logic 117 receives, using, for example, the controller 201 in communication with the communication interface 211, a request to retrieve or update data on a sector, for example, sector A. The retrieval or update request can further be analyzed at the node determination module 205. The node determination module 205 can determine one or more master nodes associated with the requested sector A using, for example, the sector map 220 of FIG. 2B. For example, the sector map 220 of FIG. 2B can include sections 221 and 223 that associate each sector with the master nodes. In the exemplary sector map 220 of FIG. 2B, the sector A can be available for access through the master nodes 2, 3, and/or 1. In one example, the determination of one or more master nodes associated with the requested sector can be based on geographical location of the master nodes, the node that received the request, or a combination therefore, in addition to use of the sector map. According to one exemplary embodiment, if the node determination module 205 determines that sector retrieval or update needs to be performed at another node, the node determination module 205 in accordance with the controller 201 and/or the communication interface 211 can forward the request to the determined (master and/or secondary) node. Alternatively, if the node determination module 205 determines that the node receiving the request can perform the requested function(s) (or the master node that received the forwarded request), the node determination module 205 can initiate a request to the query/retrieval/update module 209 to perform the requested function(s), such as, data retrieval or updating the sector A.

According to certain embodiments, the distributed database logic 117 can include and/or access a replication map, such as the replication map 230 of FIG. 2B, that includes information regarding the secondary nodes associated with the requested sector, which can be used to perform the requested function(s). In one example, the replication map 230 of FIG. 2B can include the secondary nodes and/or their status. In the exemplary replication map 230 of FIG. 2B, the sector A associated, for example, to the master node 2 can be further associated to secondary nodes 5, 6, and/or 7 with node status of "current" (C) for node 5, "dirty" (D) for node 6, and/or "suspended" (S) for node 7. Further, a checksum section for the replication map 230 can be defined for sector A associated with, for example, master node 2. The status of each secondary node in the replication map can determine whether the retrieval or update request of this example can be forwarded to the secondary node. According to certain embodiments, the replication module 207 can be configured to access and update the replication map. In one example, a master node associated with the requested sector that receives the exemplary retrieval or update request can perform the requested function(s) and/or determine a secondary node (for example, using the node determination module 205) and forward the request (with or without a checksum) to the determined secondary node.

According to one example, the request can be forwarded to the secondary nodes that have "current" status. In one example, if the request is forwarded to a secondary node, but the request is not fulfilled, the replication module 207 can update the status of that secondary node in the replication map. In one example, a "suspended" status can determine the status of the secondary node not fulfilling the request, in order to avoid future requests being directed to that node. According to certain embodiments, the replication module 207 can further be configured to generate and distribute (using, for example, the communication interface 211) sector management messages (for example, between different nodes) to maintain consistency in sector maps and handle lost master nodes by polling "current" secondary nodes.

Also, the distributed database logic 117 can include the load balance module 213 that can be configured to distribute data requests along different nodes of the distributes storage system 100 of FIG. 1A based, at least in part, on the network and/or traffic load on the nodes. As discussed earlier, according to certain embodiments, the load balance module 213 can determine (for example, in connection with the controller 201 and/or the communication interface 211) traffic load on, for example, the STBs 103a-103n and/or the service provider storage media 116a-116n. The determined load can include the upload traffic (from the nodes to the network) and/or the download traffic (from the network to the nodes). Based on the determined load, the load balance module 213 can distribute data request in a more evenly manner to the storage media that store requested data. For example, the determined load for the STBs 103a-103n can be compared to one or more thresholds to determine one or more of the set-top boxes with acceptable network load so that the request for data can be forwarded to.

Figure 3:
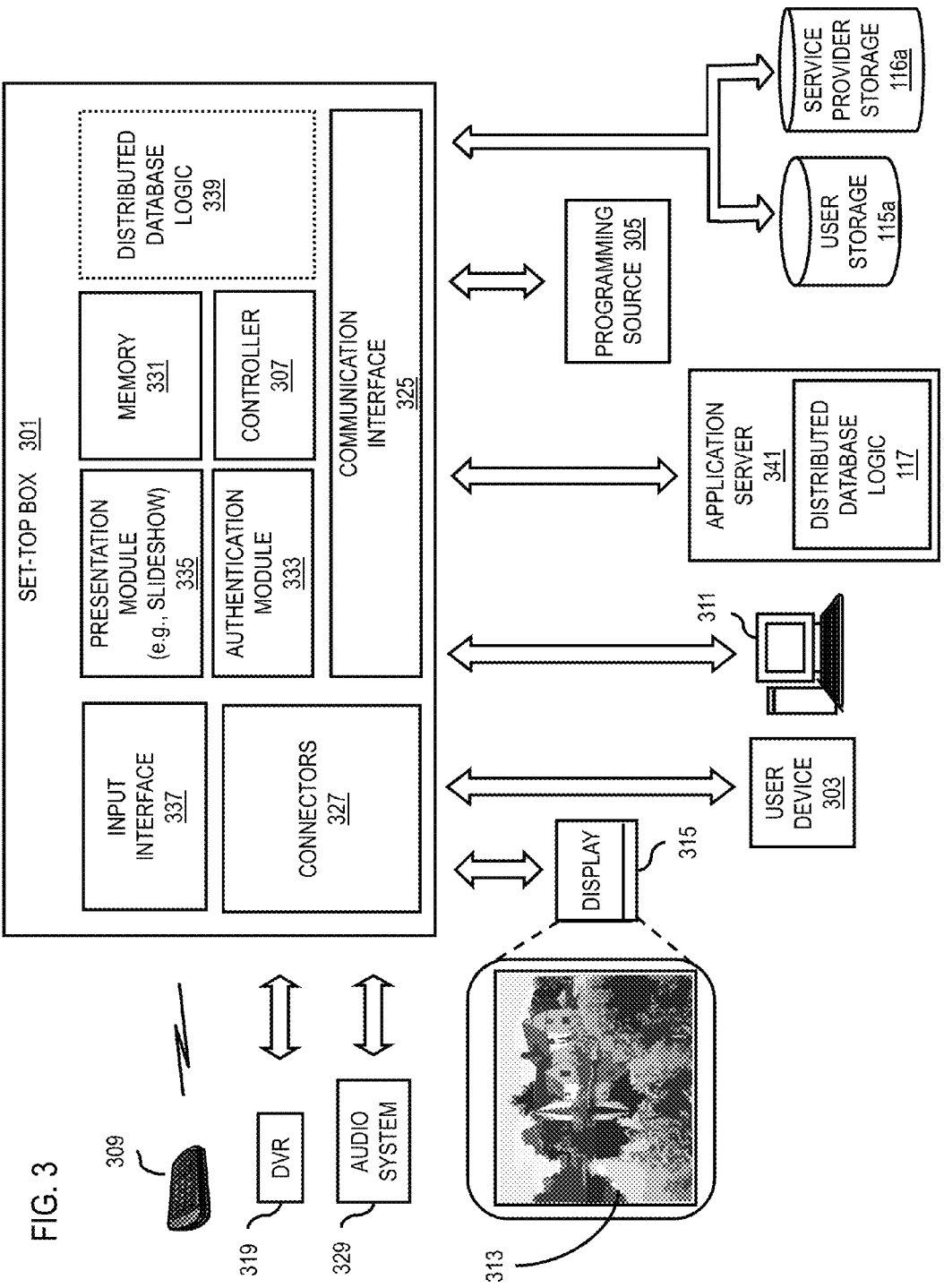
FIG. 3 is a diagram of a set-top box configured to manage a distributed storage system, according to an exemplary embodiment.

FIG. 3 is a diagram of a set-top box configured to manage a distributed storage system using consumer storage system, according to an exemplary embodiment. STB 301 can include and/or be connected to the user storage 115a and/or the service provider storage device 116a. As discussed earlier, the storage devices 115a and 116a can be separate, different sectors (or sections) of one storage device, or a combination thereof. Further, the user storage 115a can be used by the STB 301 to store data associated with the user. The service provider storage device 116a can be used for the distributed storage system 100 of FIG. 1A.

According to certain embodiments, the STB 301 can include a distributed database logic 339 configured to manage the distributed storage system, which uses consumer storage devices. In one embodiment, the distributed database logic 339 can be similar to the distributed database logic 117 of FIGS. 1A and 2A. Alternatively or additionally, the distributed database logic 339 can include different modules with respect to the distributed database logic 117 of FIG. 2A. In this example, providing the distributed database logic 339 in the STB 301 can advantageously decentralize the responsibilities of managing the distributed storage system and therefore, result in a reliable, available, and efficient storage solution. Additionally or alternatively, the distributed database management can be provided by the distributed database logic 117 located at the application server 341. Although FIG. 3 is described below with respect to the distributed database logic 339, it is contemplated that the distributed database management can be provided by the distributed database logic 339, the distributed database logic 117, or a combination thereof.

According to certain embodiments, the distributed database logic 339 and/or the service provider storage device 116a, which are used in the distributed storage system 100 of FIG. 1A, can operate without the consumer's knowledge and/or ability to access. According to an exemplary embodiment, the distributed database logic 339 (alone or in communication with the distributed database logic 117) is configured to provide access to the service provider storage device 116a located in the consumer premise to store, retrieve, update, replicate, etc. data at the service provider storage device 116a. In one example, the service provider storage device 116a can include one or more sectors and the distributed database logic 339 can maintain a sector map providing location of maser nodes for a particular sector. According to one example, the sector map can be stored in memory 331, the user storage 115a, and/or the service provider storage device 116a.

Further, STB 301 may utilize any suitable technology to receive media from user device 303, as well as one or more content streams from a programming source 305, such as the IPTV system of FIG. 1A. STB 301 may comprise computing hardware (such as described with respect to FIG. 6) and include additional components configured to provide specialized services related to the ranking and presentation of video assets in a graphical user interface. In addition, STB 301 includes hardware and/or other components to support related functions and capabilities for viewing video assets (e.g., remote control capabilities, conditional access functions, tuning functions, presentation functions, multiple network interfaces, audio/video signal ports, etc.). As shown in FIG. 3, the functions and operations of STB 301 may be governed by a controller 307 that interacts with each of the STB components to provide programming guide information and related content retrieved from an audio or video-sharing site, as well as from another STB device or component of system 100. In turn, the user may be afforded greater functionality utilizing a control device 309 to control the personalized programming guide service and related services, as will be more fully described below. Also, the control device 309 can interact with the distributed database logic 339 to support distributed storage management provided by system 100 of FIG. 1.

STB 301 may be configured to communicate with a number of user devices, including: a PC 311, laptops, PDAs, cellular phones (e.g., device 303), mobile devices, handheld devices, as well as any other equivalent technology capable of capturing and storing media. STB 301 may also interact with a PVR, such as digital video recorder (DVR) 319, to store received content that can then be manipulated by a user at a later point in time. In various embodiments, DVR 319 may be network-based, e.g., included as a part of the service provider network 101, collocated at a subscriber site having connectivity to STB 301, and/or integrated into STB 301.

Furthermore, STB 301 may include a communication interface 325 configured to receive content streams from the programming service provider 111, PC 311, server (not shown), or other programming content source, such as media source 303. Communication interface 325 may optionally include single or multiple port interfaces. For example, STB 301 may establish a broadband connection to multiple sources transmitting content to STB 301 via a single port, whereas in alternative embodiments, multiple ports may be assigned to the one or more sources. In still other embodiments, communication interface 325 may be configured to permit users, via STB 301, to transmit data (including media content) to other users with STBs, a programming service provider 111, or other content source/sink.

According to various embodiments, STB 301 may also include inputs/outputs (e.g., connectors 327) to display 315 and DVR 319, as well as an audio system 329. In particular, audio system 329 may comprise a conventional audio-video receiver capable of monaural or stereo sound, as well as multichannel surround sound. Audio system 329 may include speakers, ear buds, headphones, or any other suitable component configured for personal or public dissemination. As such, STB 301, display 315, DVR 319, and audio system 329, for example, may support high resolution audio and/or video streams, such as high definition television (HDTV) or digital theater systems high definition (DTS-HD) audio. Thus, STB 301 may be configured to encapsulate data into a proper format with required credentials before transmitting onto one or more of the networks of FIG. 1A and de-encapsulate incoming traffic to dispatch data to display 315 and/or audio system 329.

In an exemplary embodiment, display 315 and/or audio system 329 may be configured with internet protocol (IP) capability (i.e., includes an IP stack, or is otherwise network addressable), such that the functions of STB 301 may be assumed by display 315 and/or audio system 329. In this manner, an IP ready, HDTV display or DTS-HD audio system may be directly connected to one or more service provider networks 101, packet-based networks 105, and/or telephony networks 107. Although STB 301, display 315, DVR 319, and audio system 329 are shown separately, it is contemplated that these components may be integrated into a single component, or other combination of components.

An authentication module 333 may be provided at STB 301 to initiate or respond to authentication schemes of, for instance, service provider network 101 or various other content providers, e.g., broadcast television systems 123, third-party content provider systems 125, or servers 119. Authentication module 333 may provide sufficient authentication information, e.g., a user name and password, a key access number, a unique machine identifier (e.g., MAC address), and the like, as well as combinations thereof, to a corresponding network interface for establishing connectivity. As described earlier, one or more digital certificates may be simultaneously mapped. Moreover, authentication at STB 301 may identify and authenticate a second device (e.g., PC 311) communicatively coupled to, or associated with, STB 301, or vice versa. Further, authentication information may be stored locally at memory 331, in a repository (not shown) connected to STB 301, or at a remote repository, e.g., user profile repository 121.

Authentication module 333 may also facilitate the reception of data from single or disparate sources. For instance, STB 301 may receive broadcast video from a first source (e.g., IPTV system 111), signals from a second source (e.g., server 119), and a programming content stream from a third source accessible over a data network (e.g., content repository 109). As such, display 315 may present the broadcast video and programming content stream to the user. This presentation may be experienced separately, concurrently, in a toggled fashion, or with zooming, maximizing, minimizing, or trick capabilities, or equivalent mode.

Also, the authentication module 333 may facilitate the distributed storage management provided by STB 301, according to certain embodiments. According to this example, requests to access data can be received at STB 301 and the distributed database logic 339 can be configured to determine whether requested data is stored in the storage device 115b. The distributed database logic 339 in communication with the authentication module 333 can perform necessary authentication processes to ensure that the access request is valid and the requester has necessary credentials to access the data. However, it is contemplated that the authentication process can be performed at other spaces in the distributed storage system 100 of FIG. 1.

Connector(s) 327 may provide various physical interfaces to display 315, audio system 329, as well as other peripherals; the physical interfaces may include, for example, RJ45, RJ11, high definition multimedia interface (HDMI), optical, coax, FireWire, wireless, and universal serial bus (USB), or any other suitable connector. The presentation module 335 may also interact with a control device 309 for determining particular media content that a user desires to experience. In an exemplary embodiment, the control device 309 may comprise a remote control (or other access device having control capability, such as a PC 311, wireless device, mobile phone, etc.). In other examples, STB 301 may be configured for voice recognition such that STB 301 may be controlled with spoken utterances. In addition, control device 309 may include (not shown) a cursor controller, trackball, touch screen, touch pad, keyboard, and/or a key pad for activating an application, selecting programming content, as well as performing other control functions. Control device 309 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like.

Further, the control device 309 may comprise a memory (not illustrated) for storing preferences relating to different applications; such preferences can be conveyed to STB 301 through an input interface 337. The input interface 337 may support any type of wired and/or wireless link, e.g., infrared, radio frequency (RF), BLUETOOTH™, and the like. Thus, control device 309 may store user preferences with respect to the parameters associated with different applications. Alternatively, user preferences may be tracked, recorded, or stored in STB 301 or in a network user profile repository 121. The preferences may be automatically retrieved and activated by a user at any time. It is noted that the control device 309 may be separate from STB 301 or may be integrated within STB 301 (in which case certain input interface hardware and/or software may not be necessary).

Particular embodiments enable users, via control device 309, to populate or otherwise configure a user profile. For instance, a user profile application may be provided or accessed by STB 301 to enable users to populate a plurality of entry fields with user information. A user profile may include one or more customized or personalized settings relating to an application, as well as other content and applications. More specifically, the profile may include: subscription information (account number, user name, password, avatar, moniker, etc.), subscriber demographics (age, gender, ethnicity, location of residence, zip code, school district, community, socio-economic status, religion, marital status, ownerships, languages, mobility, life cycles, etc.), group/organizational affiliations (e.g., political), memberships, interests, buddies, friends, cohorts, system configurations, policies, associated users/devices, etc., as well as any other like personal information. Additionally, a user profile may include a "whitelist" specifying one or more accessible programming content sources/subjects, a "blacklist" specifying one or more programming content sources/subjects, as well as other equivalent customized settings, such as color schemes, sound effects, etc.

Figure 4A:
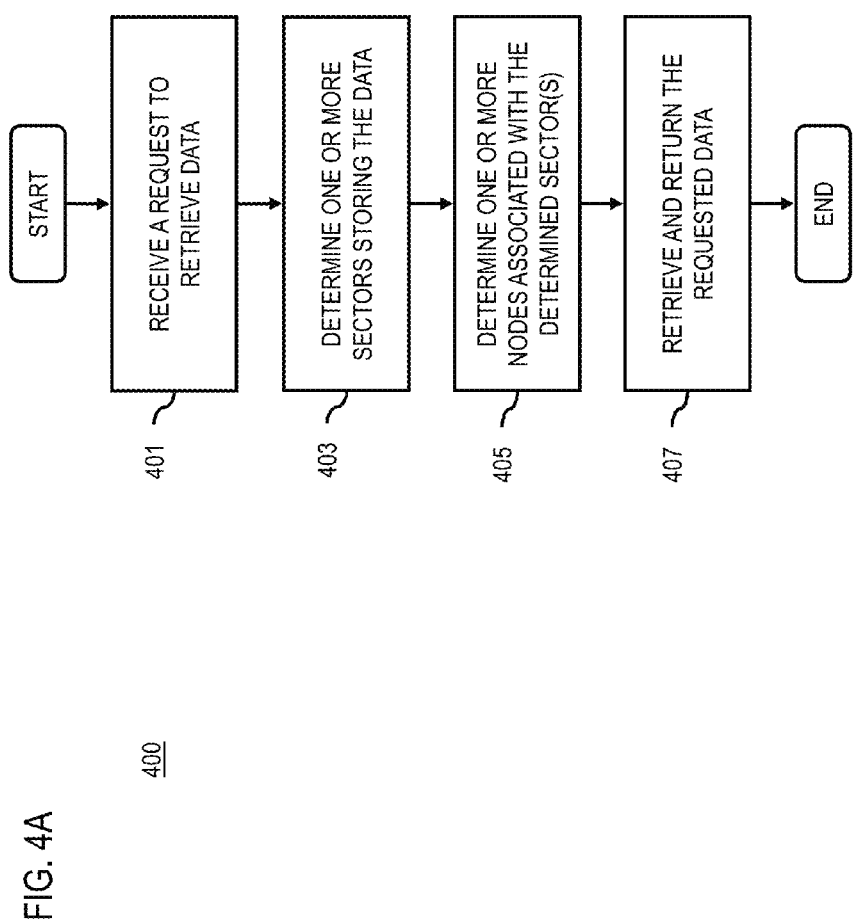
FIGS. 4A and 4B are flowcharts of processes for providing distributed storage using consumer storage devices, according to various exemplary embodiments.
Figure 4B:
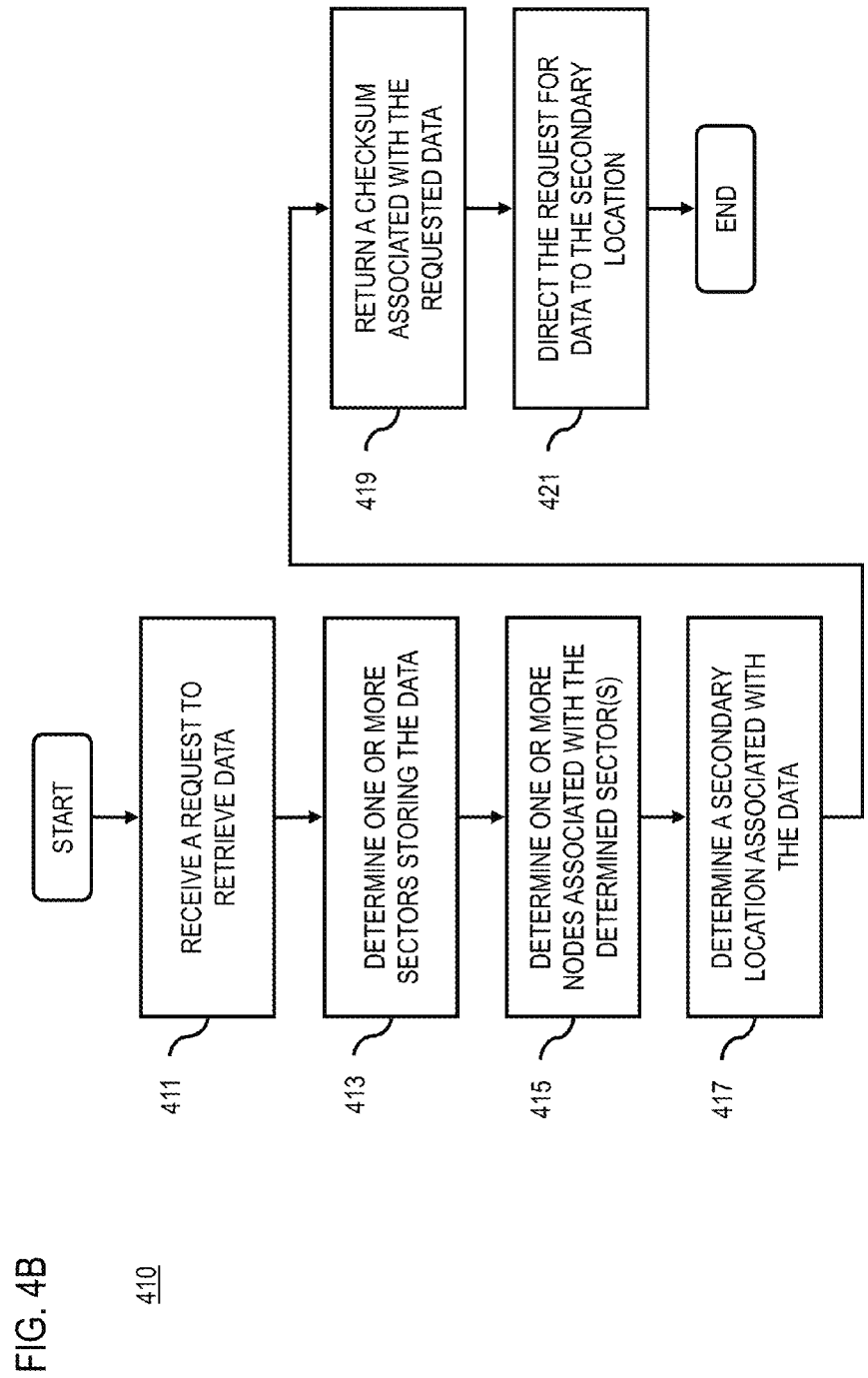

Thus, under arrangements of FIGS. 1A and 3, a distributed storage system, which can use the storage devices located in user premises, is provided that in accordance with distributed database logic (decentralized, centralized, or a combination thereof) can advantageously provide a reliable and available distributed database system that can reduce network traffic and can increase efficiency of the system FIGS. 4A and 4B are flowcharts of processes for managing a distributed storage system, which uses consumer storage device, according to various exemplary embodiments. For the purposes of explanation, these processes can be executed by the distributed database logic 117 of FIGS. 1A and/or 3 and are described with respect to the system of FIG. 1A. In step 401, a request to retrieve or update data and/or a sector of an storage device is received. In one exemplary embodiment, the retrieval or update request can include information regarding the storage sector where the data is stored. Additionally or alternatively, the process 400, in step 403, can determine one or more storage sectors where the data is stored. The distributed system 100 of FIG. 1A is capable of storing data in a distributed manner in storage devices located in consumer premises. Accordingly, to increase reliability, availability, and efficiency of data storage, multiple copies of data can be stored in different locations.

The process 400, in step 403, can be configured to determine one or more storage sectors of the data. Further, in step 405, one or more nodes (for example, location) associated with the determined sector(s) can be determined. In one exemplary embodiment, the determination of one or more nodes associated with the determined sector(s) can be performed using the sector map 220 of FIG. 2B. Additionally, the geographical location of the nodes can be used in determination of the one or more nodes. In step 407, the requested data is retrieved from the determined one or more nodes and is returned to the requester. Additionally or alternatively, if the request was an update request, data in the determined one or more nodes is updated. In this case, a sector management message can be generated and distributed to the nodes associated with the update sector such that the data update can be consistent for all multiple copies of the same data.

In steps 411 through 415 of process 410 of FIG. 4B, similar to process 400 of FIG. 4A, a request to retrieve data or update data is received, one or more storage sectors storing data is determined, and one or more nodes associated with the determined sector(s) are determined. In step 417, a secondary node associated with the requested data is determined. According to certain embodiments, the determination of the secondary can be based, at least in part, on the replication map 230 of FIG. 2B. In one example, the determined secondary node is determined based on the determined one or more nodes.

In step 419, a checksum associated with the requested data, the determined one or more sectors, the determined one or more nodes, or a combination thereof, is determined and is returned to the requester. Further, in step 421, a request for the data is generated, based at least in part, on the received message, the determined secondary node, etc., and is forwarded to the secondary node to retrieve and return the requested data or to update the requested sector. According to certain embodiments, the determination of the secondary node in step 417 is based on the status of the node in the replication map (such as the replication map 230 of FIG. 2B). Accordingly, the secondary nodes with "current" status can be selected to forward the retrieval or update request. Further, in one example, if the retrieval or update request is forwarded to the secondary node results in an indication that the request is not fulfilled, the process 410 can continue (not shown) by receiving the indication that the data retrieval or update was unsuccessful and initiating a replication map update to changes the status of the secondary node, to for example "suspended", to avoid future requests being forwarded to that location.

The described processes and arrangement advantageously provides a reliable, available, and efficient distributed storage system that can uses storage devices located in user premises and provides a distributed database (and/or storage) management system that can advantageously decentralize responsibilities, reduce network traffic, and increase efficiency. Moreover, the infrastructure of the service provider can be highly leveraged.

The processes described herein for providing a distributed storage system using consumer storage media may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
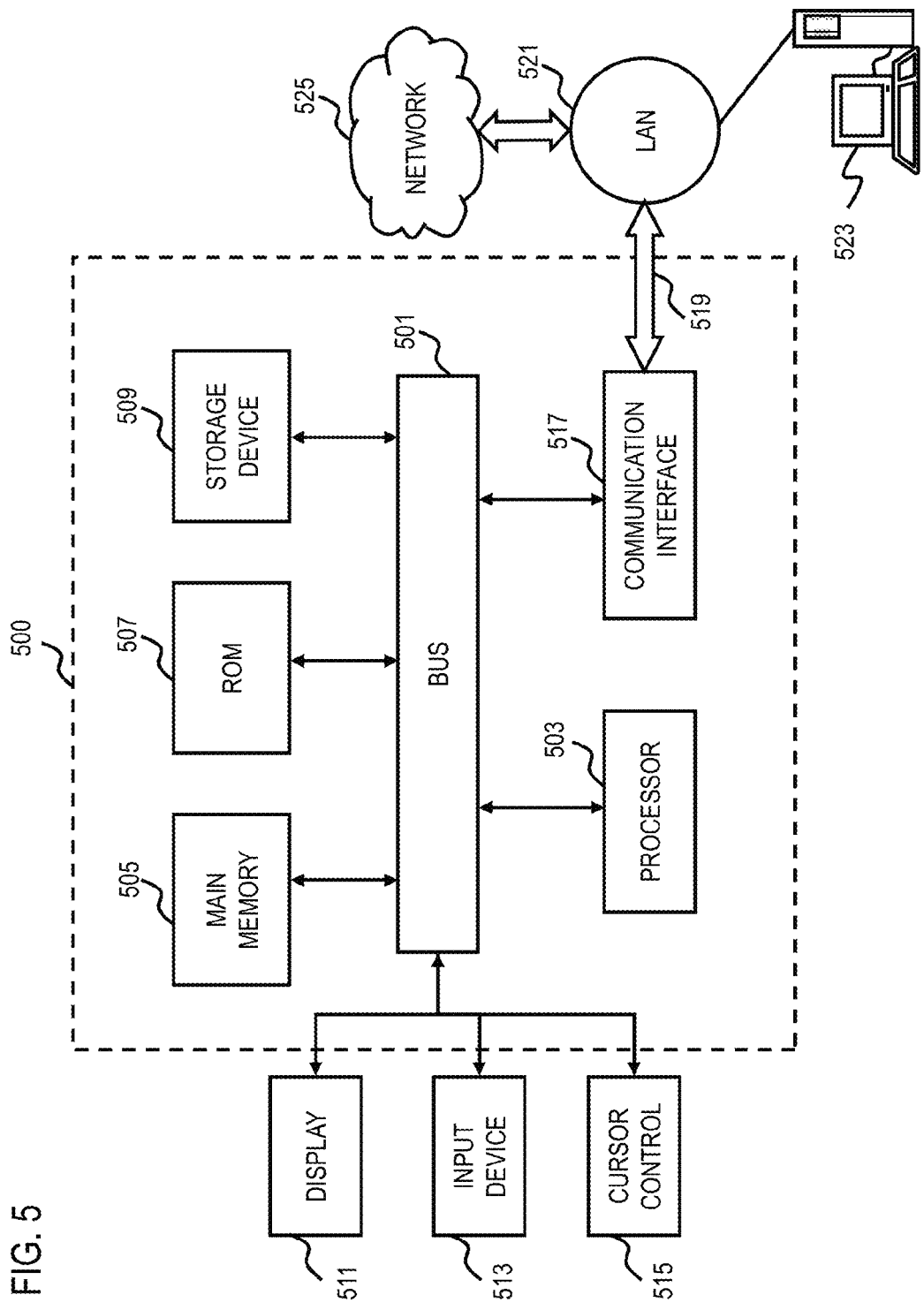
FIG. 5 is a diagram of a computer system that can be used to implement various exemplary embodiments.

FIG. 5 illustrates computing hardware (e.g., computer system) upon which an embodiment according to the invention can be implemented. The computer system 500 includes a bus 501 or other communication mechanism for communicating information and a processor 503 coupled to the bus 501 for processing information. The computer system 500 also includes main memory 505, such as random access memory (RAM) or other dynamic storage device, coupled to the bus 501 for storing information and instructions to be executed by the processor 503. Main memory 505 also can be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 6:
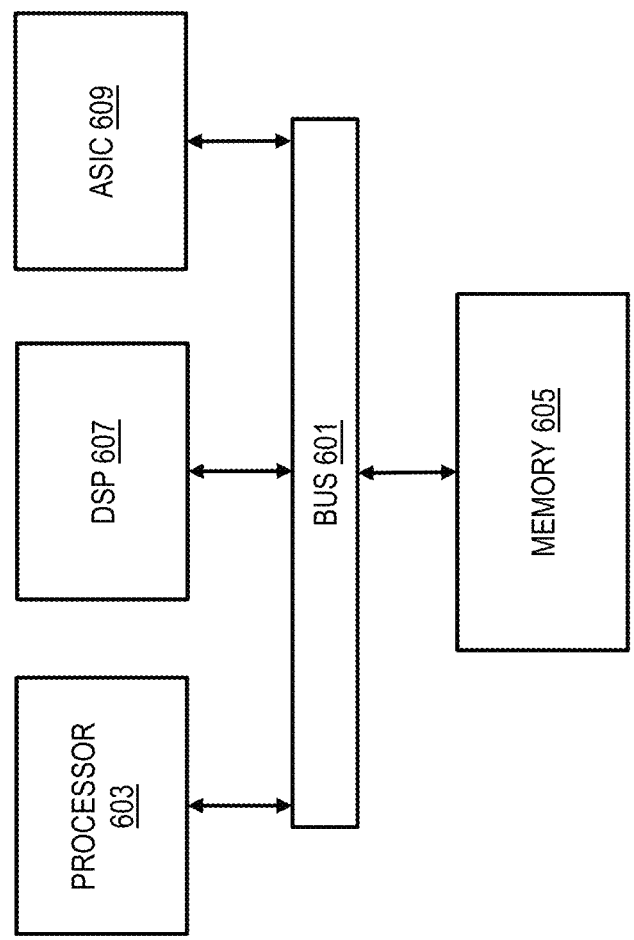
FIG. 6 is a diagram of a chip set that can be used to implement various exemplary embodiments.

FIG. 6 illustrates a chip set 600 upon which an embodiment of the invention may be implemented. Chip set 600 is programmed to provide a distributed storage system and/or management using consumer storage media as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of FIGS. 1B, 4A, and 4B.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to provide a distributed storage system and/or management using consumer storage media. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving a query for data stored in a distributed database formed by a plurality of storage media within a plurality of respective set-top boxes, wherein each of the storage media includes one or more sectors and/or partitions configured to access and/or store a replication map associated with the distributed database,
   determining which one or more of the set-top boxes is associated with the data stored in the storage media;
   determining the one or more of the set-top boxes based on a sector map relating to the distributed database, wherein the sector map includes one or more sections that associate each sector with one or more master nodes and the replication map includes a checksum section defined for at least one of the one or more sectors; and
   generating a request for the data in response to the received query, wherein the request is transmitted to the determined one or more of the set-top boxes.

2. A method according to claim 1, wherein the one or more sectors and/or partitions are designated for the distributed database and are accessible by a service provider.

3. A method according to claim 1, further comprising:
   determining a loading of resources associated with the set-top boxes; and
   selecting one or more of the set-top boxes for storing new data based on the determined loading.

4. A method according to claim 1, further comprising:
   retrieving the data from the storage media associated with the determined one or more of the set-top boxes; and
   initiating transmission of the retrieved data to an originator of the query.

5. A method according to claim 1, further comprising:
   receiving a message from one of the determined one or more of the set-top boxes indicating inability to fulfill the request for the data; and
   forwarding the query to another one of the determined one or more of the set-top boxes.

6. A method according to claim 1, wherein the sector map specifies a hierarchical structure of the one or more set-top boxes and provides locations for the one or more master nodes for a particular sector.

7. A method according to claim 1, further comprising:
   determining which of the plurality of storage media has the data stored therein for the determination of the one or more of the set-top boxes.

8. A method according to claim 1, wherein each of the set-top boxes is located within a customer premise.

9. An apparatus comprising:
   at least one processor; and
   at least one memory including computer program code,
   the at least one memory and the computer program code configured to, with the at least one processor, cause the apparatus to perform at least the following,
   receive a query for data stored in a distributed database formed by a plurality of storage media within a plurality of respective set-top boxes, wherein each of the storage media includes one or more sectors and/or partitions configured to access and/or store a replication map associated with the distributed database,
   determine which one or more of the set-top boxes is associated with the data stored in the associated partitions of the storage media;
   determine the one or more of the set-top boxes based on a sector map relating to the distributed database, wherein the sector map includes one or more sections that associate each sector with one or more master nodes and the replication map includes a checksum section defined for at least one of the one or more sectors; and
   generate a request for the data in response to the received query, wherein the request is transmitted to the determined one or more of the set-top boxes 10. An apparatus according to claim 9, wherein the one or more sectors and/or partitions are designated for the distributed database are accessible by a service provider.

11. An apparatus according to claim 9, wherein the apparatus is further caused, at least in part, to:
    determine a loading of resources associated with the set-top boxes; and
    select one or more of the set-top boxes for storing new data based on the determined loading.

12. An apparatus according to claim 9, wherein the apparatus is further caused, at least in part, to:
    retrieve the data from the storage media associated with the determined one or more of the set-top boxes; and
    initiating transmission of the retrieved data to an originator of the query.

13. An apparatus according to claim 9, wherein the apparatus is further caused, at least in part, to:
    receive a message from one of the determined one or more of the set-top boxes indicating inability to fulfill the request for the data; and
    forwarding the query to another one of the determined one or more of the set-top boxes.

14. An apparatus according to claim 9, wherein the sector map specifies a hierarchical structure of the one or more set-top boxes and provides locations for the one or more master nodes for a particular sector.

15. An apparatus according to claim 9, wherein the apparatus is further caused, at least in part, to:
    determine which of the plurality of storage media has the data stored therein for the determination of the one or more of the set-top boxes.

16. An apparatus according to claim 9, wherein each of the set-top boxes is located within a customer premise.

17. A set-top box device comprising:
    a storage media having a partition designated for a service provider for storage of data provided by the service provider, the partition being a part of a distributed database system; and
    a processor configured to receive a query for data stored in the partition, and to selectively retrieve the stored data in response to the query,
    wherein the partition is configured to store a sector map associated with the distributed database system, the sector map specifying a location of one of a plurality of set-top box devices forming the distributed database system and includes one or more sections that associate one or more of a plurality of sectors with one or more master nodes, and
    wherein the partition is further configured to store a replication map associated with the distributed database system, the replication map includes a checksum section defined for at least one of the one or more sectors.

18. A set-top box device according to claim 17, wherein the replication map specifying a location of another one of the plurality of set-top box devices, the one set-top box device being a master node responsible for replicating updated data on one or more of the remaining plurality of set-top box devices, and the another set-top box device being a secondary node.

19. A set-top box device according to claim 17, wherein the processor is further configured to forward the query to another set-top box device within the distributed database system, if the query cannot be satisfied.

20. A set-top box device according to claim 17, wherein the processor is further configured to receive a request for information about capacity of the partition to perform load balancing with respect to the distributed database system.

21. A method comprising:
forming a distributed database using a plurality of storage media within, respectively, a plurality of customer premise devices, wherein each of the storage media includes one or more sectors and/or partitions configured to access and/or store a replication map associated with the distributed database;
determining which one or more of the customer premise devices to access based on a received query;
determining the one or more of the customer premise devices based on a sector map relating to the distributed database, wherein the sector map includes one or more sections that associate each sector with one or more master nodes; and
initiating communication with the determined one or more of the customer premise devices to satisfy the query,
wherein the replication map includes a checksum section defined for at least one of the one or more sectors.

22. An apparatus comprising:
at least one processor; and
at least one memory including computer program code,
the at least one memory and the computer program code configured to, with the at least one processor, cause the apparatus to perform at least the following,
form a distributed database using a plurality of storage media within, respectively, a plurality of customer premise devices, wherein each of the storage media includes one or more sectors and/or partitions configured to access and/or store a replication map associated with the distributed database;
determine which one or more of the customer premise devices to access based on a received query;
determine the one or more of the customer premise devices based on a sector map relating to the distributed database, wherein the sector map includes one or more sections that associate each sector with one or more master nodes; and
initiate communication with the determined one or more of the customer premise devices to satisfy the query,
wherein the replication map includes a checksum section defined for at least one of the one or more sectors.

* * * * *